United States Patent
Wanner et al.

[19]

[11] Patent Number: 5,769,954
[45] Date of Patent: Jun. 23, 1998

[54] PROCESS AND DEVICE FOR TREATING THE SURFACE OF LARGE OBJECTS

[75] Inventors: Martin Wanner, Stuttgart; Thomas Fred Herkommer, Gerlingen, both of Germany

[73] Assignee: Putzmeister Aktiengesellschaft, Aichtal, Germany

[21] Appl. No.: 596,231

[22] PCT Filed: Aug. 9, 1994

[86] PCT No.: PCT/EP94/02632

§ 371 Date: Feb. 12, 1996

§ 102(e) Date: Feb. 12, 1996

[87] PCT Pub. No.: WO95/05309

PCT Pub. Date: Feb. 23, 1995

[30] Foreign Application Priority Data

Aug. 13, 1993 [DE] Germany ............................ 43 27 268.1

[51] Int. Cl.$^6$ .................................. B08B 1/00; B60S 3/00
[52] U.S. Cl. .................................. 134/6; 134/18; 15/53.2; 15/52.1; 15/88.4; 15/21.1
[58] Field of Search ..................................... 15/21.1, 49.1, 15/52.1, 53.1, 53.2, 88.4; 134/6, 18

[56] References Cited

U.S. PATENT DOCUMENTS

| | | |
|---|---|---|
| 3,104,406 | 9/1963 | Rhodes ....................................... 15/53.1 |
| 3,196,472 | 7/1965 | Ventrella .................................... 15/53.1 |
| 3,439,372 | 4/1969 | Collier . |
| 3,748,680 | 7/1973 | Griffin . |
| 3,775,798 | 12/1973 | Thornton-Trump ...................... 15/53.2 |
| 3,835,498 | 9/1974 | Arato . |
| 4,453,085 | 6/1984 | Pryor . |
| 4,590,578 | 5/1986 | Barto, Jr. . |
| 4,654,949 | 4/1987 | Pryor . |
| 4,668,301 | 5/1987 | Takigawa ................................. 15/53.2 |
| 4,826,391 | 5/1989 | Lawrence . |
| 5,092,012 | 3/1992 | Rabourn ................................... 15/53.1 |

FOREIGN PATENT DOCUMENTS

| | | |
|---|---|---|
| 0 062 244 | 10/1982 | European Pat. Off. . |
| 0 262 097 | 3/1988 | European Pat. Off. . |
| 0 404 684 | 12/1990 | European Pat. Off. . |
| 0341134 | 4/1989 | France . |
| 23 32 075 | 1/1974 | Germany . |
| 2701823 | 8/1977 | Germany . |
| 27 37 418 | 3/1979 | Germany . |
| 40 35 519 | 5/1991 | Germany . |
| 39 09 762 | 9/1996 | Germany . |
| 405097021 | 4/1993 | Japan ....................................... 15/53.1 |
| 603 383 | 8/1978 | Switzerland . |
| 2166697 | 5/1986 | United Kingdom .................... 15/53.1 |
| 9300261 | 1/1993 | WIPO . |

OTHER PUBLICATIONS

Dornier Post—Deutsche Aerospace, Jun. 30, 1993.

*Primary Examiner*—Randall Chin
*Attorney, Agent, or Firm*—Flynn, Thiel, Boutell & Tanis, P.C.

[57] ABSTRACT

A process and device are disclosed for cleaning the surface of airplanes (44). A large manipulator arranged on a truck (10) is moved towards the airplane (44) up to a predetermined position within its range of action and is parked in that position. A rotary brush bearing head (18) is moved over the surface of the object by means of an articulated mast (13) arranged on the truck (10) and constituted of several extension arms (12, 12', 12", 12''', 14) that may swivel or move with respect to each other at turning knuckles and/or prismatic joints and of a multiple joint (16) arranged at the last extension arm (14). In order to carry out a washing process in a reliable manner, without risk of collisions even when the large manipulator is not accurately positioned in front of the airplane (44), the large manipulator is parked within a limited two-dimensional parking field (46) spaced apart from the airplane (44), while the joints (20 to 26) of the articulated mast (13) and/or the multiple joint (16) are controlled during the surface treatment according to a series of predetermined sets of joint coordinates associated to the actual position of the large manipulator within the parking field (46), and the brush bearing head (18) is moved along a predetermined path of operation over the surface of the object.

19 Claims, 4 Drawing Sheets

PROCESS AND DEVICE FOR TREATING THE SURFACE OF LARGE OBJECTS

FIELD OF THE INVENTION

The invention relates to a process for treating, in particular for cleaning, the surface of large objects, such as airplanes, ships, buildings, in which a large manipulator arranged on an undercarriage is moved into a specified position toward the large object and is parked there, and in which a tool, preferably designed as a rotating brush head, is moved over the surface of the object by means of an articulated mast. The mast is arranged on the undercarriage and consists of several arms, which are pivotal or movable with respect to each other on pivot and/or thrust points, and, if necessary, a multiple joint is arranged on the last arm. Furthermore, the invention relates to an arrangement for accomplishing this process.

BACKGROUND OF THE INVENTION

The DE-A-4035519 already suggests to equip a large manipulator with a remote-controllable brush head. The known large manipulator has an articulated mast, which can be assembled of several arms pivotal with respect to one another at their ends, the base arm is rotatably supported about a vertical axis on a bearing block arranged on a motor-driven undercarriage, and the last arm has a multiple joint, which can be equipped with the brush head. From this reference it is also known to provide the brush head with sensors, which enable a automatic control of the brush head relative to the surface to be treated in accordance with a sensor signal originating at the sensor during the cleaning operation and can be outputted.

The basic purpose of the invention is to develop a process and an arrangement of the above-disclosed type, with which in the case of an inexact positioning of the undercarriage carrying the large manipulator in front of the large object to be treated and also in the case of surfaces having a complicated design, a collision-free fully automatic treatment is possible.

To attain this purpose the characteristic combinations disclosed herein are suggested. Advantageous embodiments and further developments of the invention result from the dependent claims.

SUMMARY OF INVENTION

The solution of the invention is based on the thinking that in the case of an inexact positioning of the undercarriage, first it is necessary to determine the actual station coordinates, and then a movement program for the joints of the articulated mast and/or the multiple joint, which program relates to the actual station coordinates, is to be set up. Accordingly, the invention suggests that the undercarriage is stationed within a limited two-dimensional parking field spaced from the large object to be treated, and that the joints of the articulated mast and/or of the multiple joint are controlled during the surface treatment in accordance with a series of joint-coordinate sets associated with the actual position of the large manipulator within the parking field, and the tool is thereby moved along a specified operating path over the surface of the object.

A preferred embodiment of the invention provides thereby that the parking field is divided by a limited two-dimensional distance grid, that for each grid point of the distance grid there is specified a series of joint-coordinate sets defining the support points of the operating path of the tool stored as a joint-coordinate data file in a data bank of a data-processing system, and that the position-referenced joint coordinate sets, preferably through interpolation from the joint-coordinate data files stored in the data bank, are calculated in accordance with the actual position of the undercarriage within the distance grid and are stored in the working data file, prior to starting the surface treatment by using the joint-coordinate sets selected from the working data file and, if necessary, additional movement-referenced parameters. The joint-coordinate sets selected from the working data file can follow in accordance with sensor signals preferably extracted at each support point of the operating path. For this purpose it is, for example, possible to measure the frictional or torsion resistance or the bearing pressure engaging the tool and to read same as a sensor signal for the guiding of the joint coordinates. Accordingly, it is also possible to measure other physical sizes, for example the distance of the tool from the object or a variable inclination of the large manipulator resulting from the deformations of the substructure, and to read same as a sensor signal. Also, in order to avoid during the guiding of the joint coordinates undesired collisions, it is advantageous to check the actual joint coordinate sets with respect to freedom from collisions through a comparison with joint coordinates stored with respect to adjacent grid points of the distance grid taking into consideration specified tolerance limits.

In a preferred arrangement for carrying out the process of the invention, in which the large manipulator has an articulated mast, which consists of several arms pivotal with respect to one another on pivot joints by means of hydraulic or motorized driving systems and rotatably supported with its base arm about a vertical axis on a pivot-bearing block of a motor-driven undercarriage, and has a tool preferably designed as a rotating brush head and arranged on the last arm of the articulated mast or on the free end of a multiple joint arranged on the last arm and having several thrust and/or pivot joints, it is suggested in order to attain the above-disclosed purpose that an opto-electronic distance camera, which can be aligned with the large object to be treated, is arranged on the undercarriage, and a calculator-supported evaluating electronics, which is loaded with the distance-image signals of the distance camera, is provided as an aid for moving and positioning, and for locating the large manipulator relative to the large object to be treated. The distance camera is thereby advantageously arranged rigidly or movably, in particular, pivotally about a vertical axis and/or inclinable about at least one horizontal axis on the large manipulator in the vicinity of the pivot-bearing block.

In order to create an association between the coordinates determined by the distance camera and the tool coordinates of the articulated mast, the evaluating electronics has, according to the invention, a program part for normalizing the joint coordinates of the articulated mast in accordance with the tool coordinates measured directed and the above electronic camera relative to a stationary, preferably cubic calibration member. Errors in the position of the large manipulator due to deformations of the arms, zero-position offset of the angle and path receiver and torsions in the substructure of the articulated arm and of the undercarriage are detected during this normalization.

The evaluating electronics has furthermore advantageously a storage arrangement for storing the reference-image data of marked sections of the large object viewed from a specified parking field and a software routine for comparing the distance-image data taken by the distance camera with the large manipulator positioned in front of the large object within reach of the articulated mast with the reference-image data with a coordinate-like association of the large manipulator position within the specified limited parking field. The parking field is advantageously divided by a two-dimensional distance grid, whereby with each grid point of the distance grid is associated a joint-coordinate data file or a movement program within a data bank, in which a series of joint-coordinate sets of the articulated mast along a operating path to be travelled by the tool on the surface of the object is stored.

In order to measure the joint coordinates a coordinate receiver preferably in the form of an angle or path receiver, is associated with each joint of the articulated mast and, if necessary, of the multiple joint at the output of which receive the respective joint coordinate can be read.

The evaluating electronics has advantageously a program for calculating and storing a series of position-referenced joint-coordinate sets, which series is designated for the treatment operation, through interpolation from the stored joint-coordinate sets in accordance with the deviation of the actual position of the large manipulator from the next grid point within the specified distance grid.

To carry out the treatment operation, the evaluating electronics has a calculator-supported circuit part for controlling the drive systems of the articulated-mast joints in accordance with the deviation of the joint coordinates instantaneously read at the coordinate receivers from the associated values of the stored joint-coordinate sets. In order to be able to compensate for tolerance deviations, the tool has a sensor, which reacts to the distance from the surface to be treated, to its treatment resistance or to its depth of penetration into the surface to be treated, whereby correcting signals can be derived from the sensor signal in order to have the driving systems of the articulated-mast joints follow.

In order to, in addition, be able to compensate for deformations in the substructure of the large manipulator during the washing operation, at least one inclination indicator is associated with the pivot and/or inclination axes of the distance camera, from the output signals of which inclination indicator can be derived the correcting signals in order to have the driving systems follow.

BRIEF DESCRIPTION OF THE DRAWING

The invention will be discussed in greater detail hereinafter in connection with one exemplary embodiment, which is schematically illustrated in the drawings, in which.

DETAILED DESCRIPTION

Figure 1:
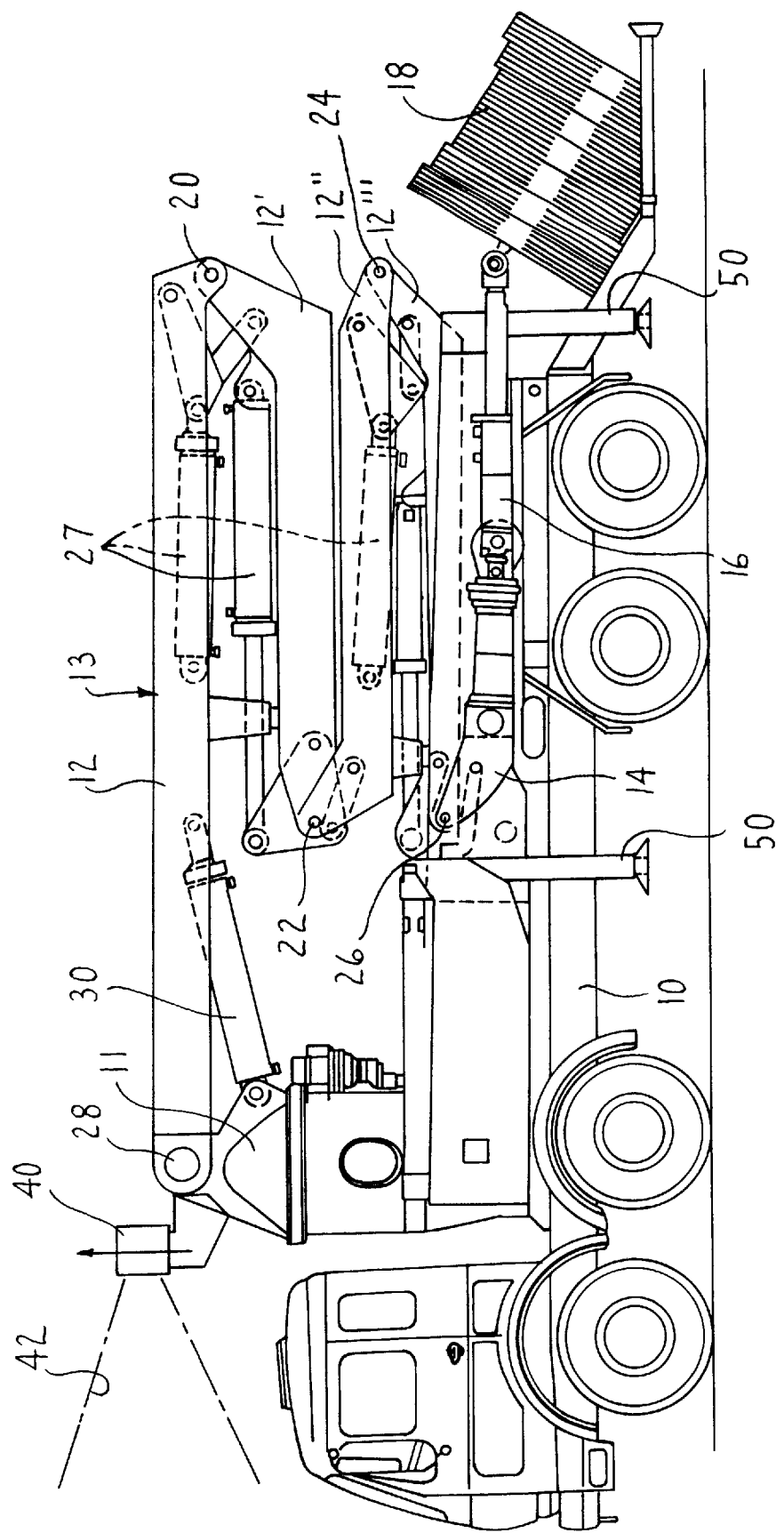
FIG. 1 is a side view of a movable large manipulator with a brush head for washing of airplanes in a collapsed position.
Figure 2A:
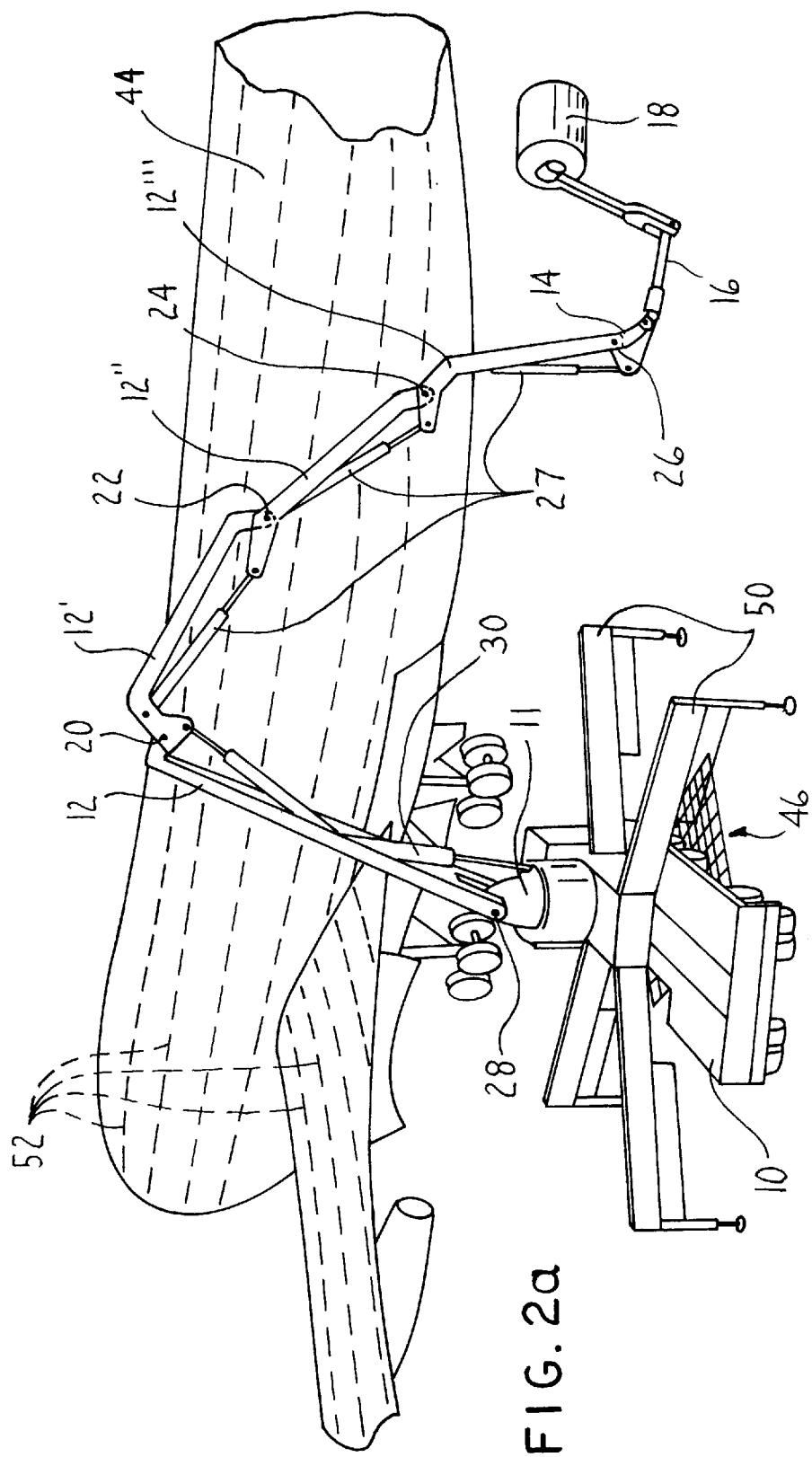
FIGS. 2a and 2b are two diagrammatic illustrations of the large manipulator in an operating position in front of an aircraft.
Figure 2B:
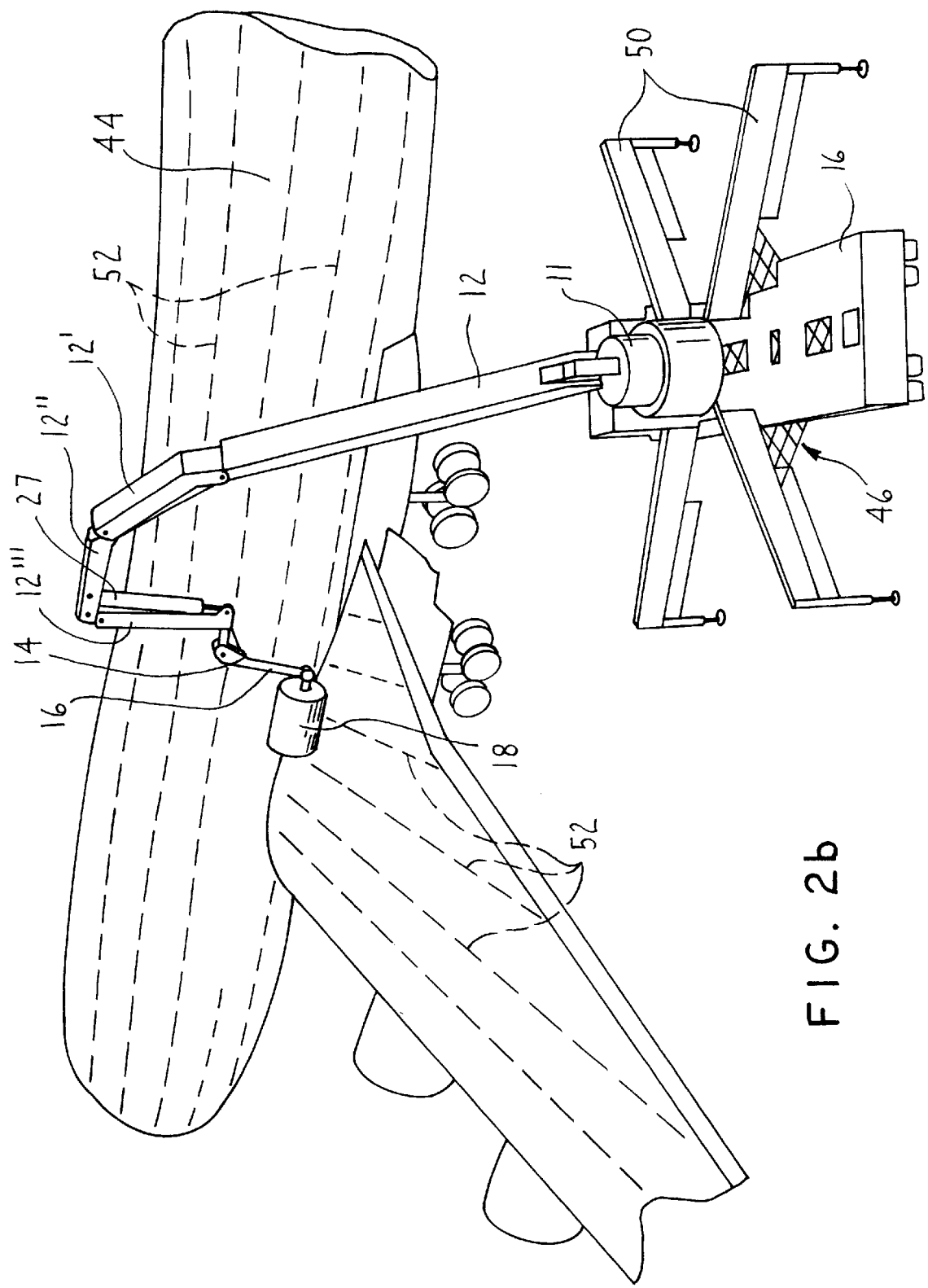
Figure 3:
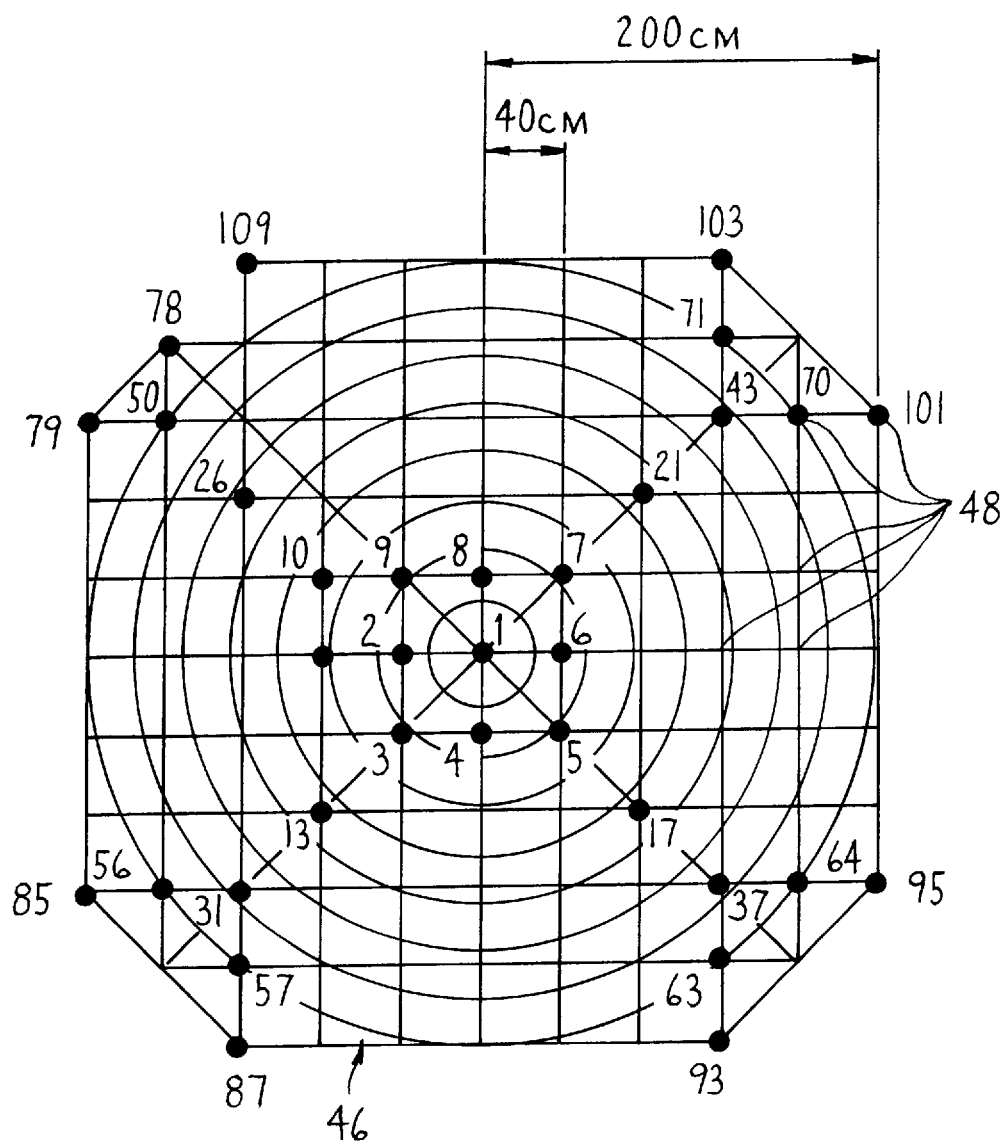
FIG. 3 is a top view of the grid-like parking field for the large manipulator according to FIGS. 2a and 2b.

The mobile large manipulator illustrated in FIGS. 1 and 2 consists essentially of an articulated mast rotatably supported with its base arm 12 about a vertical axis on a pivot-bearing block 11 of a motor-driven undercarriage 10, a multiple joint 16 arranged on the last arm 14 of the articulated mast 13 and a brush head 18 releasably fastened to the free end of the multiple joint. The five arms 12, 12', 12", 12''' and 14 of the articulated mast 13 are connected with one another at their ends facing one another limited pivotally about horizontal axes at joints 20, 22, 24, 26. The pivoting is done by means of hydraulic cylinders 27, which are arranged between the arms at suitable points. The base arm 12 is supported pivotally on the pivot-bearing block 11 on a horizontal bearing 28 by means of a hydraulic drive 30. This arrangement makes it possible to cover with the brush head 18 any desired surface contours within the plane defined by the arms. With the help of the multiple joint 16, which can be adjusted by a motor, it is additionally possible to move the brush head 18 in six degrees of freedom about several pivot and thrust axes relative to the last arm 14.

In the area of the pivot-bearing block 11 there is arranged an opto-electronic distance camera 40 in the form of a 3-D laser scanner, which detects a three-dimensional space within the viewing window 42 and digitalizes same with respect to the distance from an object of measurement 44. The distance camera 40 is arranged at a sufficient height above the undercarriage 10, in order to be able to measure significant areas of the object of measurement 44 from the viewing window 42. The distance camera 40 works with a laser beam which is moved with a specific cycle frequency through the opening angle of the viewing window 42. The evaluation of the distance signals, which result from a time-difference measurement, permits the recognitional whether and at what distance a reflecting surface exists.

In order to adjust the distance measurement with the distance camera 40 and the deflection of the articulated mast 13 taking into consideration the various articulated-mast configurations to one another, a normalization of the manipulator with respect to the distance camera 40 is necessary. The zero positions of the manipulator axes of joints 20, 22, 24, 26 and of bearing 28 are fixed during the normalization. These zero positions are determined through a closed kinematic chain, which, using a measuring cube, brings the measured results of the distance camera into relationship with the deflections of the articulated mast. The measuring cube is thereby oriented such that with the distance camera 40 a corner is located and this corner is used as a reference point for the positioning of the last arm 14 of the articulated mast 13. The angular positions of the joints during a plurality of articulated-mast configurations are hereby determined. From this result parameters for a set of equations based on which the coordinate transformation between the electronic camera 40 and the manipulator 13 can be determined. The zero positions of the individual joints are determined with these measurements, taking into consideration the deformations in the individual arms (12, 12', 12", 12''', 14), which right from the start cannot be exactly defined. The measurements are carried out at various distances in the measuring cube by the distance camera 40 in order to take into consideration the various constellations of the manipulator in consideration of the zero-position errors and of the deformations and of the orientation of the distance camera 40 relative to the manipulator system.

In order to move the large manipulator into a washing position in front of the aircraft 44, it must be put into a definite position during the course of the starting operation so that all surface areas to be covered during a washing program lie within the reach of the articulated mast 13 with the washing brush 18. In order to avoid unnecessary complications during the starting and positioning of the large manipulator, a parking field 46 with a diameter of approximately 4 m is defined in each washing position, which in turn is divided into a rectangular grid with a grid spacing of 40 cm between the individual grid points 48. The grid spacing must thereby be no more exact than the exactness of the object to be measured. It is to be considered thereby that in the case of aircrafts, already due to tolerances between the individual models of a specific type and due to different loads and temperature conditions, differences in measurement of 50 cm and more can result.

The image data produced through the distance camera 40 is evaluated in an evaluating circuit and an on-board calculator. A significant section of the airplane 44 is stored with reference to the viewing window 42 of the distance camera 40 as a reference image in a storage medium of the on-board calculator for each type of airplane to be worked and for each parking field 46 to be controlled. The distance camera continuously produces a distance image of the respective airplane section as an aid for moving into the parking field 46 and compares said image with the stored reference image. Direction and position data can be derived therefrom, which give the driver instructions for the direction of travel and the distance. Also, it is basically possible to convert the deviating signals resulting from this directly into driving and steering signals for the undercarriage. Goal of the aid for moving is to position the large manipulator on the parking field 46 within reach of the airplane 44 and to orient same with respect to the course angle. After reaching the parking field 46, the undercarriage 10 is supported on the ground by swinging out and by lowering the support legs 50 and is thus positioned relative to the airplane.

The large manipulator can then be adjusted, namely its position within the grid field 46 and the orientation relative to the airplane 44 can be determined. This is also done with the help of the distance camera 40 through comparison with a stored reference sample. Since the distance camera is arranged at the articulated mast 13, it must be assured that its position is also considered when determining the course angle. After the adjustment, the inclination indicators are detected at the distance camera 40 and are set to zero. The relative angle is then considered in the movement program during a movement of the articulated mast 13 based on the inclination of the base.

Artificial set-up points 1 to 109 are then determined by the grid field 46, for each of which an offline (thus on an external calculator) created complete washing program is stored. A plurality of data sets, which define the angular positions of each joint, are stored as washing-program data (joint coordinate sets). Several such joint coordinate sets form a working path 52 along the airplane surface, which define the geometric location of the brush head during the washing operation. The washing program is checked on the external calculator such that no collision with the object, or possibly existing docks, or hall parts can occur. The distance between the individual coordinate support points is on the average 30 cm on the airplane surface. The exact position of the distance camera 40 with respect to the airplane 44 is now determined during the adjustment and thus the exact spot within the grid field 46. The joint coordinates are then recalculated from the next-lying grid point 48 by interpolation to the actual base. These data are stored in a data file in the operating store of the manipulator control as the actual washing program before the washing program is started through the manipulator control. Furthermore, the collision space of the individual joints is determined through the four adjacent points 48 within the grid field 46 and the permitted tolerances of, for example, ±50 cm. These four adjacent points, converted into joint coordinates, thus describe the space, in which the ends of the articulated-mast arms are permitted to move.

When these preparations have been made, the actual washing operation can start. The articulated mast is for this purpose unfolded through an unfolding program. By successively recalling the joint coordinates from the operating data file desired-values are obtained, which are reached by the washing brushes, whereby the actual and desired value comparison at each individual joint occurs through the associated coordinate indicator. Because of deformations of the airplane and of the substructure, inexactnesses of the process, and dynamic errors of the device, a fine tuning must be carried out. In order to achieve the demanded washing result, the manipulator must be moved with an exactness of approximately 10 mm with respect to the prescribed penetrating depth of the washing brush into the surface. This can only be achieved with an additional sensory mechanism, which compensates for the mentioned errors by measuring the bearing pressure and by supplying the auxiliary axes of the multiple joint 16. The auxiliary axes are telescopic axes, which compensates for position errors and, about a pivot axis, the orientation errors of the brush head.

It is basically possible to permit the distance camera 40 to also run during the course of a washing program and to utilize same for monitoring collisions. The distance camera 40 can hereby measure individual joints and the airplane and control these preventing collisions. This could be important if, for example, a measured-value receiver at one of the joints breaks down and delivers incorrect measured values, which are not recognized by the operator and by the calculator.

In conclusion the following is to be stated: The invention relates to a process and an arrangement for the surface cleaning of airplanes 44, in which a large manipulator, which is arranged on an undercarriage 10, is moved into a specified position within the reach of the airplane 44 and is there parked, and in which a rotating brush head 18 is moved over the surface of the object by means of an articulated mast 13, which is arranged on the undercarriage 10 and consists of several arms 12, 12', 12", 12''', 14, which are pivotal or movable with respect to one another on pivot and/or thrust joints, and a multiple joint 16 arranged on the last arm. In order to guarantee a reliable and collision-free washing operation even during an inexact positioning of the large manipulator in front of the airplane 44, the large manipulator is stationed within a limited two-dimensional parking field 46 spaced from the airplane 44, whereas the joints 20, 22, 24, 26 and the bearing 28 of the articulated mast 13 and/or of the multiple joint 16 are controlled during the surface treatment in accordance with a series of joint-coordinate sets associated with the actual position of the large manipulator within the parking field 46. The brush head 18 is thereby moved along a predetermined operating path over the surface of the object.

We claim:

1. A process for treating a surface of large objects, comprising the steps of moving a large manipulator arranged on an undercarriage into a parking position within reach to the large object, while in the parking position positioning the undercarriage spaced from the object in a two-dimensional parking field having a specified boundary to define an actual parking position, determining the position and orientation of the large object with respect to the actual parking position of the large manipulator, moving a treatment tool over the surface of the large object along a specified working path associated with the actual parking position of the large manipulator by means of an articulated mast which is arranged on the undercarriage and consists of several arms, pivoting the arms with respect to one another on pivot joints, treating the surface of the object with the treatment tool, and controlling the joints of the articulated mast during the surface treatment in accordance with a series of specified joint-coordinate sets, which series is associated with the actual parking position of the large manipulator within the parking field.

2. The process according to claim 1, further comprising the steps of taking a distance image of a specified section of the large object to be treated with an opto-electronic distance camera while approaching the object, comparing the distance image to a reference image of the specified section stored in a memory device to determine deviations, and converting the resulting deviations into one of steering signals when the undercarriage is outside of the parking field and position-determining locating signals when the undercarriage is within the parking field.

3. The process according to claim 1, further comprising the steps of dividing the parking field into a two-dimensional distance grid having grid points, specifying the series of joint-coordinate sets defining the support points of an operating path of the tool for each grid point, storing the series of joint-coordinate sets as a joint-coordinate data file in a data bank of a data-processing system, and storing the joint-coordinate sets corresponding to the grid point at which the undercarriage is parked in a working data file before the treatment of the surface is triggered using the joint-coordinate sets selected from one of the working data file and additional movement-referenced parameters.

4. The process according to claim 3, further comprising the steps of interpolating the position-referenced joint-coordinate sets from the joint-coordinate data file stored in the data bank in accordance with the actual position of the large manipulator within the distance grid, and storing the interpolated position-referenced joint-coordinate sets in the working data file.

5. The process according to claim 3, further comprising the steps of measuring the position of the articulated arm by sensors producing sensor signals, and comparing the sensor signals measured at each support point along the working path with the joint-coordinate sets selected from the working data file to determine the actual path of the articulated arm.

6. The process according to claim 5, wherein the step of measuring the position of the articulated arm includes measuring at least one of frictional resistance, torsion resistance and bearing pressure experienced by the treatment tool.

7. The process according to claim 5, wherein the step of measuring the position of the articulated arm includes the steps of measuring the distance of the tool from the large object without contact and producing a sensor signal corresponding to the distance measurement of the tool from the large object.

8. The process according to claim 5, further comprising the steps of measuring the inclination of the large manipulator with respect to one of a substructure supporting the undercarriage and the object, and outputting the measured inclination as a sensor signal.

9. The process according to claim 5, further comprising the step of comparing the joint-coordinate sets guiding the arm to joint-coordinates stored with respect to adjacent grid points taking into consideration specified tolerance limits of arm movement to prevent collisions between the arm and at least the object.

10. An arrangement for treating a surface of large objects positioned adjacent a parking field, comprising a large manipulator having an articulated mast, an undercarriage and a pivot-bearing block positioned on the undercarriage, the articulated mast consists of several arms pivotally connected to one another at pivot joints by means of hydraulic or motorized driving systems and is rotatably supported by a base arm of the several arms about a vertical axis on the pivot-bearing block, a drive means for pivoting respective ones of the arms about the pivot joints, a treatment tool arranged on a last arm of the articulated mast for treating the surface of the large object, an opto-electronic distance camera arranged on the large manipulator and alignable with the large object to be treated producing distance image signals measured to the large object, and an electronic means receiving the distance-image signals of the distance camera for aiding in one of positioning the undercarriage and locating the large manipulator relative to the large object to be treated, the electronic means having a storage arrangement for storing reference-image data of the large object viewed from the parking field with a specified boundary arranged spaced from the large object, and a software means for comparing distance-image data from the distance image signals taken by the distance camera when the large manipulator is positioned so that the articulated mast reaches the large object with the reference-image data to determine a coordinate positioning of the large-manipulatorwithin the parking field.

11. The arrangement according to claim 10, wherein the distance camera is arranged pivotally about a vertical axis and inclinable about at least one horizontal axis on the large manipulator adjacent the pivot-bearing block.

12. The arrangement according to claim 10, wherein a coordinate indicator is connected to each joint of the articulated mast, the coordinate indicator measuring one of the angle of the arms at the joint and the path of the joint and outputting a joint coordinate signal.

13. The arrangement according to claim 12, wherein the distance camera outputs a tool coordinate signal corresponding to the measured distance of the tool, and wherein the electronic means has a calculator-supported circuit for normalizing the joint coordinate signal with the tool coordinate signal relative to a stationary, cubic calibration volume.

14. The arrangement according to claim 10, wherein a data bank stores at least one of a joint-coordinate data file and a moving program, and wherein the parking field is divided by a two-dimensional distance grid defining grid points, each grid point within the distance grid is associated with one of the joint-coordinate data file and the moving program, and the joint-coordinate file stores a series of joint-coordinate sets of the articulated mast along an operating path to be travelled by the tool for treating the surface of the object.

15. The arrangement according to claim 14, wherein the electronic means has a software means for calculating and storing a series of joint-coordinate sets for effecting the treatment operation by interpolation of the stored joint-coordinate sets according to the deviation of the actual position of the large manipulator from the adjacent grid point within the distance grid.

16. The arrangement according to claim 14, wherein the electronic means has a means for controlling the drive means of the articulated-mast pivot joints in accordance with the deviation of the joint coordinates measured by the coordinate indicators from the associated values of the stored joint-coordinate sets.

17. The arrangement according to claim 14, wherein the tool has a sensor means for measuring one of the distance from the surface to be treated, operating resistance of the tool, and penetration depth of the tool into the surface to be treated, the sensor means producing an output signal received by the electronic means, and the electronic means deriving correction signals for controlling the drive means of the articulated-mast joints.

18. The arrangement according to claim 14, wherein at least one inclination indicator measuring deformations in a substructure supporting the large manipulator is associated with at least one of the pivot and inclination axes of the distance camera, the inclination indicator producing output signals received by the electronic means, the electronic means deriving correcting signals from the output signals for controlling the drive means of the articulated-mast joints.

19. The arrangement according to claim 10, wherein a multiple joint having multiple degrees of freedom of movement is arranged on the last arm of the articulated mast, and the treatment tool is a rotating brush head positioned on the multiple joint.

* * * * *

UNITED STATES PATENT AND TRADEMARK OFFICE
CERTIFICATE OF CORRECTION

PATENT NO. : 5 769 954
DATED : June 23, 1998
INVENTOR(S) : Martin WANNER et al

It is certified that error appears in the above-indentified patent and that said Letters Patent is hereby corrected as shown below:

Column 7, lines 62 and 63; delete "by means of hydraulic or motorized driving systems".

Signed and Sealed this

Seventeenth Day of November, 1998

Attest:

BRUCE LEHMAN

*Attesting Officer*   Commissioner of Patents and Trademarks